(12) United States Patent
Huang et al.

(10) Patent No.: US 11,837,827 B2
(45) Date of Patent: Dec. 5, 2023

(54) VEHICLE POWER ADAPTOR MODULE

(71) Applicant: DELTA ELECTRONICS, INC., Taoyuan (TW)

(72) Inventors: Kang Huang, Taoyuan (TW); Jui-Yen Chin, Taoyuan (TW); Ri-Long Lo, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 139 days.

(21) Appl. No.: 17/347,556

(22) Filed: Jun. 14, 2021

(65) Prior Publication Data

US 2021/0391679 A1     Dec. 16, 2021

Related U.S. Application Data

(60) Provisional application No. 63/038,917, filed on Jun. 15, 2020.

(30) Foreign Application Priority Data

Apr. 29, 2021    (CN) .......................... 202110473714.4

(51) Int. Cl.
*H01R 31/06* (2006.01)
*H01R 13/703* (2006.01)
(Continued)

(52) U.S. Cl.
CPC ....... *H01R 31/065* (2013.01); *H01R 13/6666* (2013.01); *H01R 13/6683* (2013.01);
(Continued)

(58) Field of Classification Search
CPC .............. H01R 31/065; H01R 13/6666; H01R 13/6683; H01R 13/6691; H01R 13/7036;
(Continued)

(56) References Cited

U.S. PATENT DOCUMENTS 8,973,816 B1 *  3/2015  Saini ...................... H01R 13/44
                                                          439/38
9,321,433 B2   4/2016  Yin et al.
(Continued)

FOREIGN PATENT DOCUMENTS

CN         1846346 A     10/2006
CN       104701701 A      6/2015
(Continued)

OTHER PUBLICATIONS

The pertinent parts of US20120081067A1.

*Primary Examiner* — Oscar C Jimenez
*Assistant Examiner* — Paul D Baillargeon
(74) *Attorney, Agent, or Firm* — CKC & Partners Co., LLC

(57) ABSTRACT

A vehicle power adaptor module includes a vehicle-sided connector and an interchangeable socket. The vehicle-sided connector includes a connector body and a first connecting portion. The first connecting portion is connected with the connector body. The connector body is configured to electrically connect with an electric vehicle. The interchangeable socket includes a socket body and a second connecting portion. The second connecting portion is connected with the socket body. The socket body is configured to electrically connect with an electronic equipment. The second connecting portion is configured to detachably connect with the first connecting portion.

14 Claims, 9 Drawing Sheets

(51) Int. Cl.
*H01R 13/66* (2006.01)
*H01R 27/02* (2006.01)
*H01R 13/713* (2006.01)

(52) U.S. Cl.
CPC ..... *H01R 13/6691* (2013.01); *H01R 13/7036* (2013.01); *H01R 13/7137* (2013.01); *H01R 27/02* (2013.01); *H01R 2201/26* (2013.01)

(58) Field of Classification Search
CPC . H01R 13/7137; H01R 27/02; H01R 2201/26
See application file for complete search history.

(56) References Cited

U.S. PATENT DOCUMENTS

| | | | |
|---|---|---|---|
| 9,635,773 B1* | 4/2017 | Marshall | H01R 13/70 |
| 2004/0085793 A1 | 5/2004 | Afzal et al. | |
| 2010/0270985 A1 | 10/2010 | Ko et al. | |
| 2012/0081067 A1* | 4/2012 | Burrell, IV | H01R 13/7175 320/107 |
| 2020/0317069 A1 | 10/2020 | Akai et al. | |

FOREIGN PATENT DOCUMENTS

| | | |
|---|---|---|
| CN | 204578117 U | 8/2015 |
| CN | 205646892 U | 10/2016 |
| CN | 107887767 A | 4/2018 |
| CN | 209544755 U | 10/2019 |
| CN | 210576903 U | 5/2020 |
| JP | 2003-263252 A | 9/2003 |
| JP | 3141522 U | 5/2008 |
| JP | 2010-136558 A | 6/2010 |
| JP | 2011-193683 A | 9/2011 |
| JP | 3215447 U | 3/2018 |
| TW | I407651 B | 9/2013 |
| WO | 2019/107324 A1 | 6/2019 |

* cited by examiner

VEHICLE POWER ADAPTOR MODULE

RELATED APPLICATIONS

This application claims priority to U.S. Provisional Application Ser. No. 63/038,917 filed Jun. 15, 2020, and Chinese Application Serial Number 202110473714.4 filed Apr. 29, 2021, which are herein incorporated by reference.

BACKGROUND

Technical Field

The present disclosure relates to vehicle power adaptor modules.

Description of Related Art

In recent years, electric vehicles have become more and more popular in the market because of their significant features such as high efficiency, energy saving, low noise and zero emission.

Similarly, with the continuous improvement of the living quality of people and the rapid development of the technology, various kinds of electronic devices have become an indispensable part of daily lives of people. For example, these electronic devices include, but are not limited to, smart phones, smart watches and tablet computers.

Therefore, a simple and easy way to allow electric vehicles to provide electricity to different types of electronic devices can undoubtedly provide convenience to the users.

SUMMARY

A technical aspect of the present disclosure is to provide a vehicle power adaptor module, which can allow the electric vehicle to electrically connect with electronic equipment having different specifications of plugs.

According to an embodiment of the present disclosure, a vehicle power adaptor module includes a vehicle-sided connector and an interchangeable socket. The vehicle-sided connector includes a connector body and a first connecting portion. The first connecting portion is connected with the connector body. The connector body is configured to electrically connect with an electric vehicle. The interchangeable socket includes a socket body and a second connecting portion. The second connecting portion is connected with the socket body. The socket body is configured to electrically connect with an electronic equipment. The second connecting portion is configured to detachably connect with the first connecting portion.

In one or more embodiments of the present disclosure, the socket body includes at least one connector. The connector is configured to allow a plug of the electronic equipment to electrically connect with. The connector is of a format of Universal Serial Bus (USB).

In one or more embodiments of the present disclosure, a type of the connector is a Type-A connector, a Type-B connector, a Type-C connector, a Mini-A connector, a Mini-B connector, a Micro-A connector or a Micro-B connector.

In one or more embodiments of the present disclosure, the socket body further includes a button adjacent to the connector. The button is signally connected with the electric vehicle and is configured to be pressed by the plug of the electronic equipment.

In one or more embodiments of the present disclosure, the connector body further includes a live line, a neutral line, a sensor, a switch and a proximity detector. The live line and the neutral line are respectively configured to electrically connect with the electric vehicle and the first connecting portion. The sensor is electrically connected between the live line and the neutral line and is signally connected with the button. The switch is signally connected with the sensor and the proximity detector. The proximity detector is configured to signally connect with a control unit of the electric vehicle.

In one or more embodiments of the present disclosure, the button provides a signal to the sensor when the plug presses on the button.

In one or more embodiments of the present disclosure, a quantity of the connector is plural. Types of the connectors are different from each other.

In one or more embodiments of the present disclosure, a quantity of the connector is plural. Types of the connectors are the same as each other.

In one or more embodiments of the present disclosure, the socket body has two first socket holes and one second socket hole. The first socket holes and the second socket hole are configured to allow a plug of the electronic equipment to insert into. The first socket holes and the second socket hole are arranged in a triangular manner.

In one or more embodiments of the present disclosure, the connector body further includes a live line, a neutral line, a voltage detecting device, a switch and a proximity detector. The live line and the neutral line are respectively configured to electrically connect with the electric vehicle and the first connecting portion. The voltage detecting device is electrically connected between the live line and the neutral line and is configured to detect a voltage difference between the live line and the neutral line. The switch is signally connected with the voltage detecting device and the proximity detector. The proximity detector is configured to signally connect with a control unit of the electric vehicle.

In one or more embodiments of the present disclosure, the voltage detecting device starts up the switch and the switch then turns off the proximity detector when the voltage difference between the live line and the neutral line is detected to be larger than a pre-determined value by the voltage detecting device.

In one or more embodiments of the present disclosure, the connector body further includes a live line, a current detecting device, a switch and a proximity detector. The live line is configured to electrically connect with the electric vehicle and the first connecting portion. The current detecting device is electrically connected with the live line and is configured to detect a current of the live line. The switch is signally connected with the current detecting device and the proximity detector. The proximity detector is configured to signally connect with a control unit of the electric vehicle.

In one or more embodiments of the present disclosure, the current detecting device starts up the switch and the switch then turns off the proximity detector when the current of the live line is detected to be larger than a pre-determined value by the current detecting device.

In one or more embodiments of the present disclosure, the connector body further includes a temperature detecting device, a switch and a proximity detector. The temperature detecting device is connected with the connector body and is configured to detect a temperature of the connector body. The switch is signally connected with the temperature detecting device and the proximity detector. The proximity detector is configured to signally connect with a control unit of the electric vehicle.

In one or more embodiments of the present disclosure, the temperature detecting device starts up the switch and the switch then turns off the proximity detector when the temperature of the connector body is detected to be larger than a pre-determined value by the temperature detecting device.

According to another embodiment of the present disclosure, a vehicle power adaptor module includes a vehicle-sided connector and an interchangeable socket. The vehicle-sided connector includes a connector body and a first connecting portion. The first connecting portion is connected with the connector body. The connector body is configured to electrically connect with an electric vehicle. The interchangeable socket includes a socket body, a second connecting portion and a connecting cable. The socket body is configured to electrically connect with an electronic equipment. The second connecting portion is configured to detachably connect with the first connecting portion. The connecting cable is connected between the socket body and the second connecting portion.

When compared with the prior art, the above-mentioned embodiments of the present disclosure have at least the following advantage:

(1) Since a user can separate the interchangeable socket from the vehicle-sided connector and the electronic equipment in a simple and easy manner, the user can replace and use an appropriate one of the interchangeable socket according to different plug types of the electronic equipment or according to different specifications of the plugs of the electronic equipment of different countries. In other words, by replacing an appropriate one of the interchangeable socket, the electric vehicle can be electrically connected with different types of the electronic equipment so as to supply electricity to different types of the electronic equipment, which is convenient to the user.

(2) When the plug of the electronic equipment is not electrically connected with the connector of the socket body, the button of the socket body does not send any signal to the electric vehicle. Correspondingly, the electric vehicle does not supply electricity to the vehicle power adaptor module. Apart from a saving of electricity, this can also enhance the safety of use of the vehicle power adaptor module.

(3) With the presence of the voltage detecting device, the current detecting device and the temperature detecting device of the connector body, when the electric vehicle supplies electricity to the electronic equipment through the vehicle power adaptor module, the voltage difference, the current or the temperature can be avoided from getting too high inside the vehicle-sided connector. Thus, the safety of use of the vehicle power adaptor module can be enhanced.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
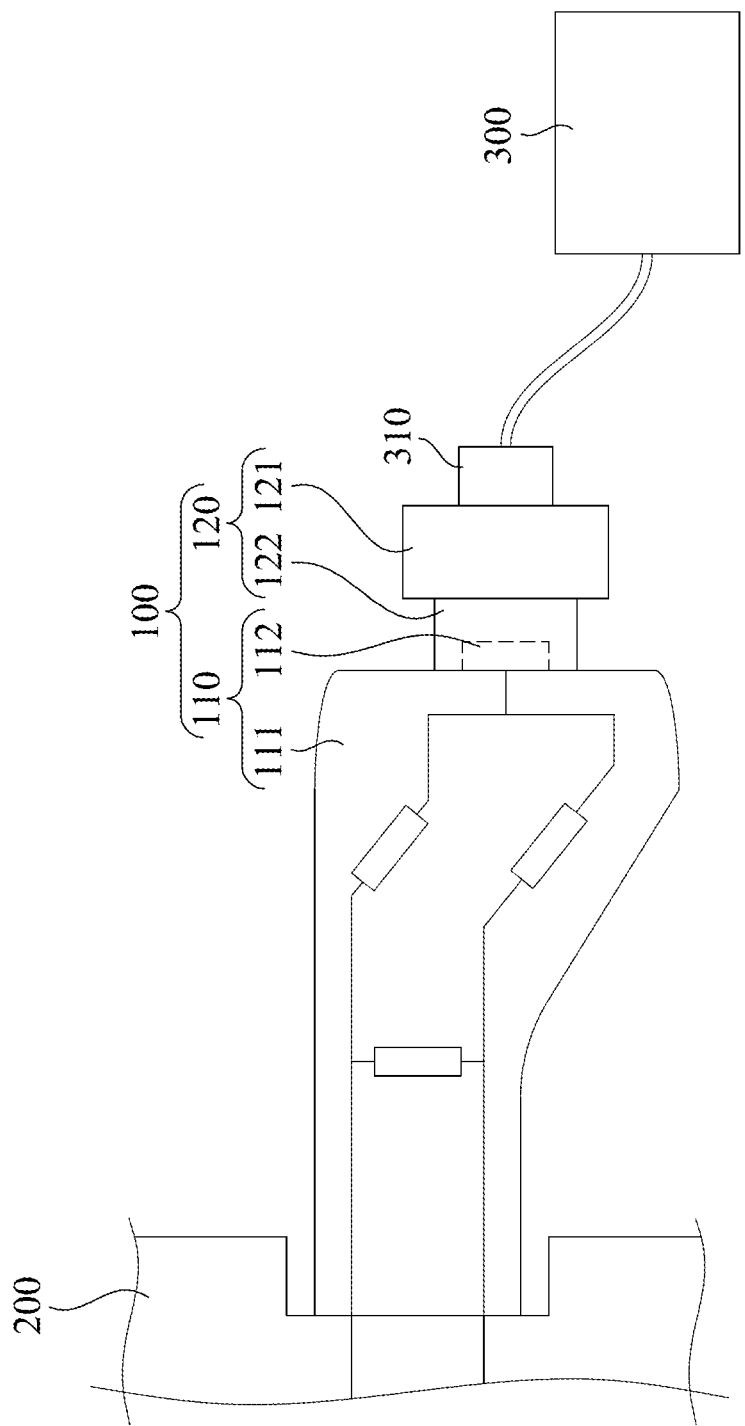
FIG. 1 is a schematic view of application of a vehicle power adaptor module according to an embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference is made to FIG. 1. FIG. 1 is a schematic view of application of a vehicle power adaptor module 100 according to an embodiment of the present disclosure. In this embodiment, as shown in FIG. 1, a vehicle power adaptor module 100 includes a vehicle-sided connector 110 and an interchangeable socket 120. The vehicle-sided connector 110 includes a connector body 111 and a first connecting portion 112. The first connecting portion 112 is connected with the connector body 111. The connector body 111 is configured to electrically connect with an electric vehicle 200. The interchangeable socket 120 includes a socket body 121 and a second connecting portion 122. The second connecting portion 122 is connected with the socket body 121. The socket body 121 is configured to electrically connect with an electronic equipment 300. The second connecting portion 122 of the interchangeable socket 120 is configured to detachably connect with the first connecting portion 112 of the vehicle-sided connector 110. When the vehicle power adaptor module 100 is connected between the electric vehicle 200 and the electronic equipment 300, the electric vehicle 200 is able to supply electricity to the electronic equipment 300 through the vehicle power adaptor module 100, such that the electronic equipment 300 can be turned on, or the electronic equipment 300 can be electrically charged.

Figure 2:
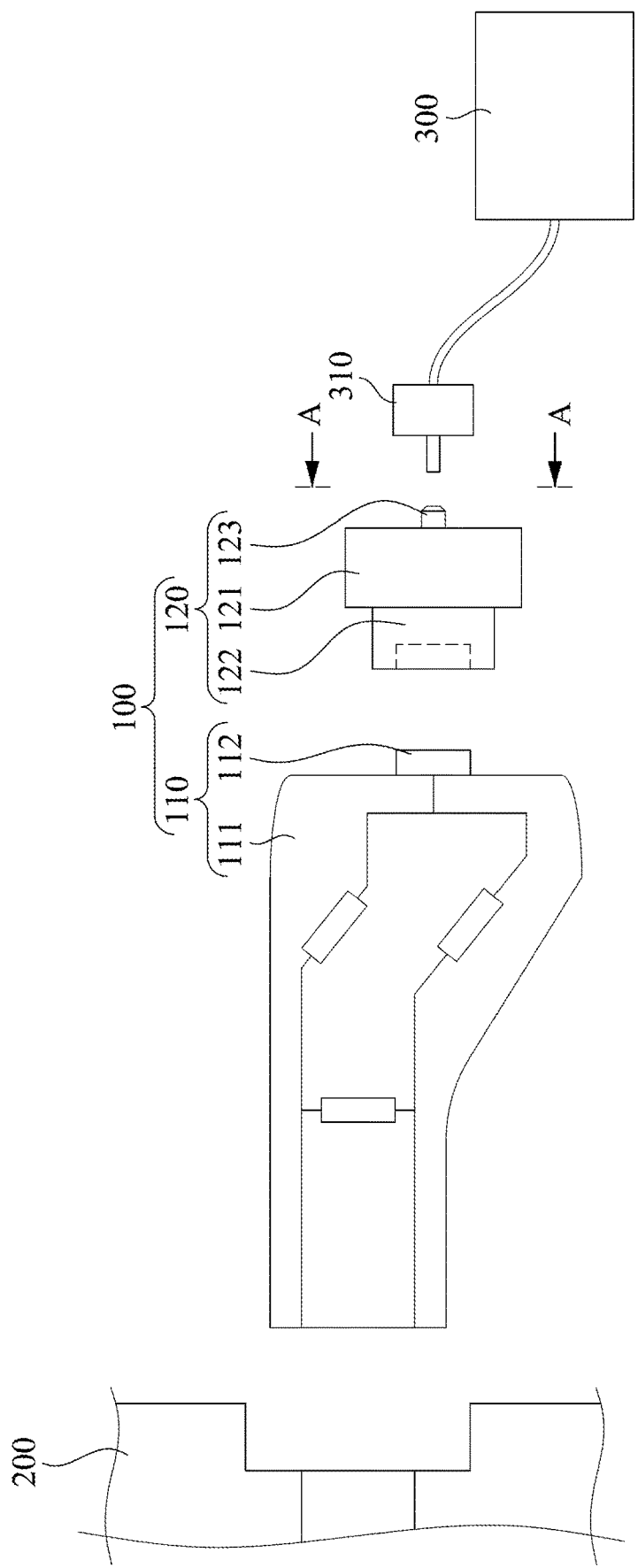
FIG. 2 is a schematic view of the vehicle power adaptor module of FIG. 1, in which the vehicle-sided connector and the interchangeable socket are separated from each other.

Reference is made to FIG. 2. FIG. 2 is a schematic view of the vehicle power adaptor module 100 of FIG. 1, in which the vehicle-sided connector 110 and the interchangeable socket 120 are separated from each other. As mentioned above, the second connecting portion 122 of the interchangeable socket 120 can be detachably connected with the first connecting portion 112 of the vehicle-sided connector 110. In this embodiment, as shown in FIG. 2, the vehicle power adaptor module 100 is separated from the electric vehicle 200 and the electronic equipment 300, and the second connecting portion 122 of the interchangeable socket 120 and the first connecting portion 112 of the vehicle-sided connector 110 are also separated from each other. Since a user can separate the interchangeable socket 120 from the vehicle-sided connector 110 and the electronic equipment 300 in a simple and easy manner, the user can replace and use an appropriate one of the interchangeable socket 120 according to different plug types of the electronic equipment 300 or according to different specifications of the plugs of the electronic equipment 300 of different countries. In other words, by replacing an appropriate one of the interchangeable socket 120, the electric vehicle 200 can be electrically connected with different types of electronic equipment 300 so as to supply electricity to different types of electronic equipment 300, which is convenient to the user.

Figure 3:
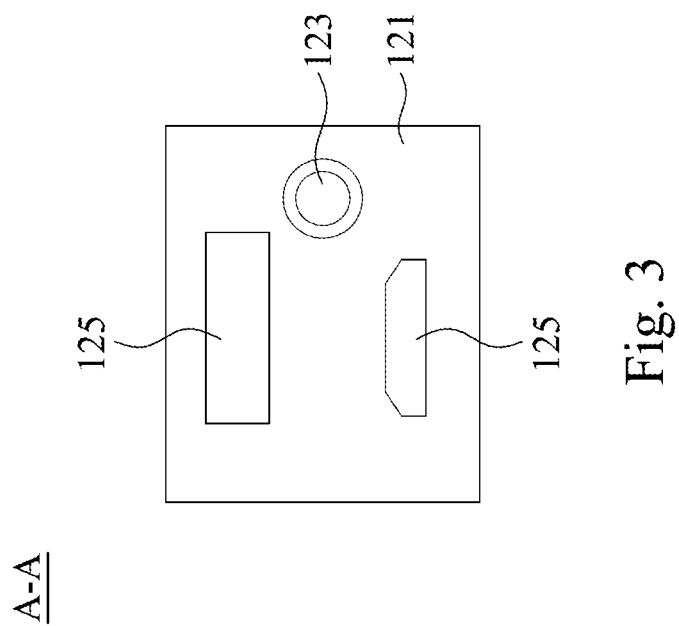
FIG. 3 is a front view along the sectional line A-A of FIG. 2, in which the types of the connectors are different from each other.

Reference is made to FIG. 3. FIG. 3 is a front view along the sectional line A-A of FIG. 2, in which the types of the connectors 125 are different from each other. In this embodiment, as shown in FIG. 3, the socket body 121 of the interchangeable socket 120 includes at least one connector 125. The connector 125 is configured to allow a plug 310 (please refer to FIGS. 1-2) of the electronic equipment 300 to electrically connect with. The connector 125 is of a format of Universal Serial Bus (USB). To be more specific, in practical applications, a type of the connector 125 can be a Type-A connector, a Type-B connector, a Type-C connector, a Mini-A connector, a Mini-B connector, a Micro-A connector or a Micro-B connector. However, this does not intend to limit the present disclosure.

In addition, as shown in FIG. 3, a quantity of the connector 125 is two, and the types of the connectors 125 are different from each other. For example, when one of the connectors 125 is a Type-C connector, another one of the connectors 125 can be a Micro-A connector.

Moreover, in this embodiment, as shown in FIGS. 2-3, the socket body 121 further includes a button 123. The button 123 is adjacent to the connector 125. In practical applications, the button 123 is signally connected with the electric vehicle 200, and is configured to be pressed by the plug 310 of the electronic equipment 300. To be specific, when the plug 310 of the electronic equipment 300 is electrically connected with the connector 125 of the socket body 121 and presses on the button 123, the electric vehicle 200 can receive a signal from the button 123. Only under such a situation, the electric vehicle 200 supplies electricity to the electronic equipment 300 through the vehicle power adaptor module 100. In other words, when the plug 310 of the electronic equipment 300 is not electrically connected with the connector 125 of the socket body 121, the button 123 of the socket body 121 does not send any signal to the electric vehicle 200. Correspondingly, the electric vehicle 200 does not supply electricity to the vehicle power adaptor module 100. Apart from a saving of electricity, this can also enhance the safety of use of the vehicle power adaptor module 100.

Figure 4:
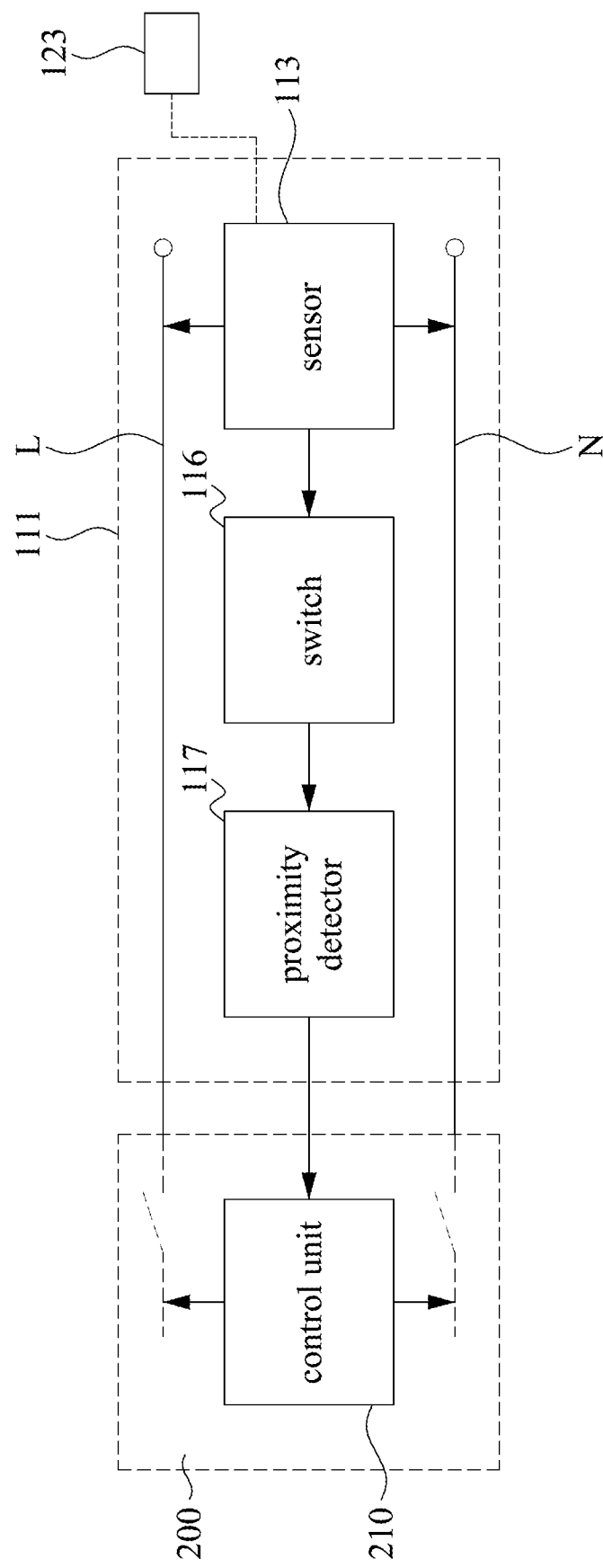
FIG. 4 is a schematic view of function blocks of the vehicle power adaptor module of FIG. 1.

Reference is made to FIG. 4. FIG. 4 is a schematic view of function blocks of the vehicle power adaptor module 100 of FIG. 1. In this embodiment, as shown in FIG. 4, the connector body 111 further includes a live line L, a neutral line N, a sensor 113, a switch 116 and a proximity detector 117. The live line L and the neutral line N are respectively configured to electrically connect with the electric vehicle 200 and the first connecting portion 112 (please refer to FIGS. 1-2). The sensor 113 is electrically connected between the live line L and the neutral line N and is signally connected with the button 123. The switch 116 is signally connected with the sensor 113 and the proximity detector 117. The proximity detector 117 is configured to signally connect with a control unit 210 of the electric vehicle 200.

As mentioned above, when the plug 310 of the electronic equipment 300 presses on the button 123, the button 123 provides a signal to the sensor 113. At this point, the sensor 113 starts up the switch 116, and the switch 116 starts up the proximity detector 117, such that the control unit 210 of the electric vehicle 200 is able to receive a signal from the proximity detector 117. Only under such a situation, the electric vehicle 200 supplies electricity to the electronic equipment 300. Thus, the safety of use of the vehicle power adaptor module 100 can be enhanced.

Figure 5:
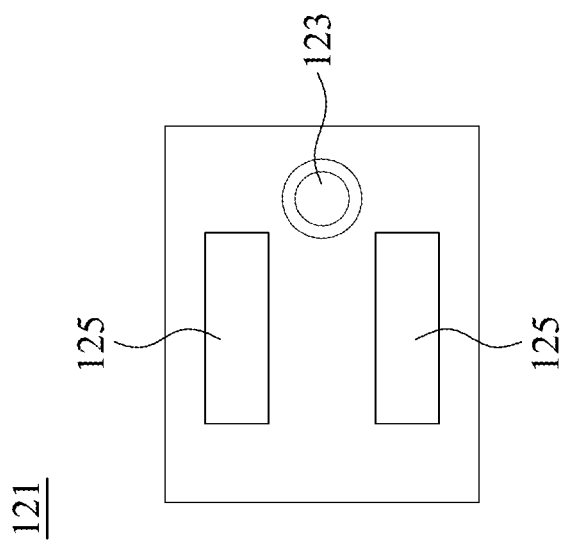
FIG. 5 is a front view of a socket body according to another embodiment of the present disclosure, in which the types of the connectors are the same as each other.

Reference is made to FIG. 5. FIG. 5 is a front view of a socket body 121 according to another embodiment of the present disclosure, in which the types of the connectors 125 are the same as each other. In this embodiment, as shown in FIG. 5, the types of the connectors 125 are the same as each other. For example, when one of the connectors 125 is a Mini-B connector, another one of the connectors 125 can also be a Mini-B connector.

Figure 6:
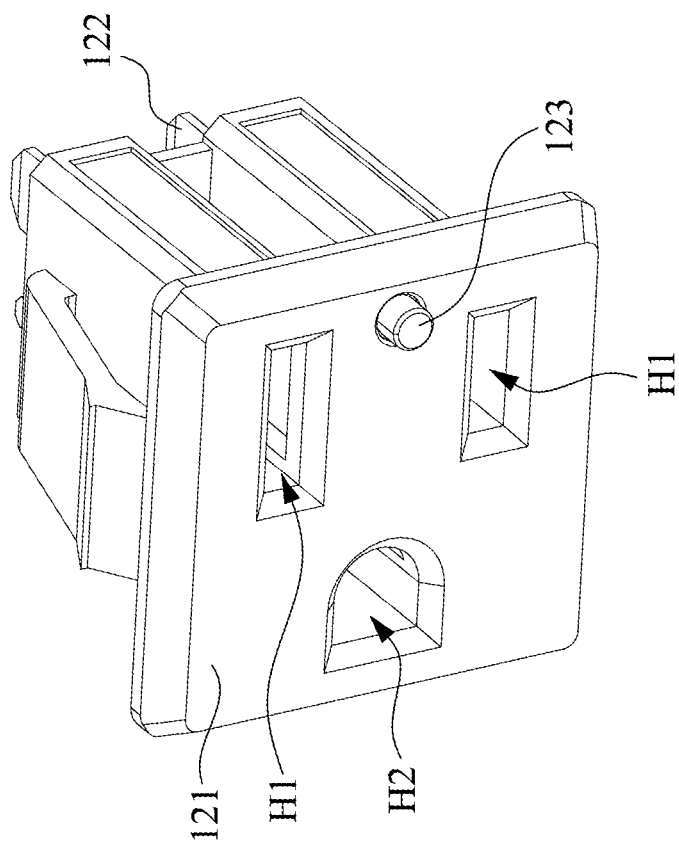
FIG. 6 is a schematic view of an interchangeable socket according to a further embodiment of the present disclosure.

Reference is made to FIG. 6. FIG. 6 is a schematic view of an interchangeable socket 120 according to a further embodiment of the present disclosure. In this embodiment, as shown in FIG. 6, the socket body 121 has two first socket holes H1 and one second socket hole H2. The first socket holes H1 and the second socket hole H2 are configured to allow a plug 310 of the electronic equipment 300 to insert into. In this embodiment, as shown in FIGS. 3-4, the first socket holes H1 and the second socket hole H2 are arranged in a triangular manner, such that a traditional three-pin plug can insert into.

Figure 7:
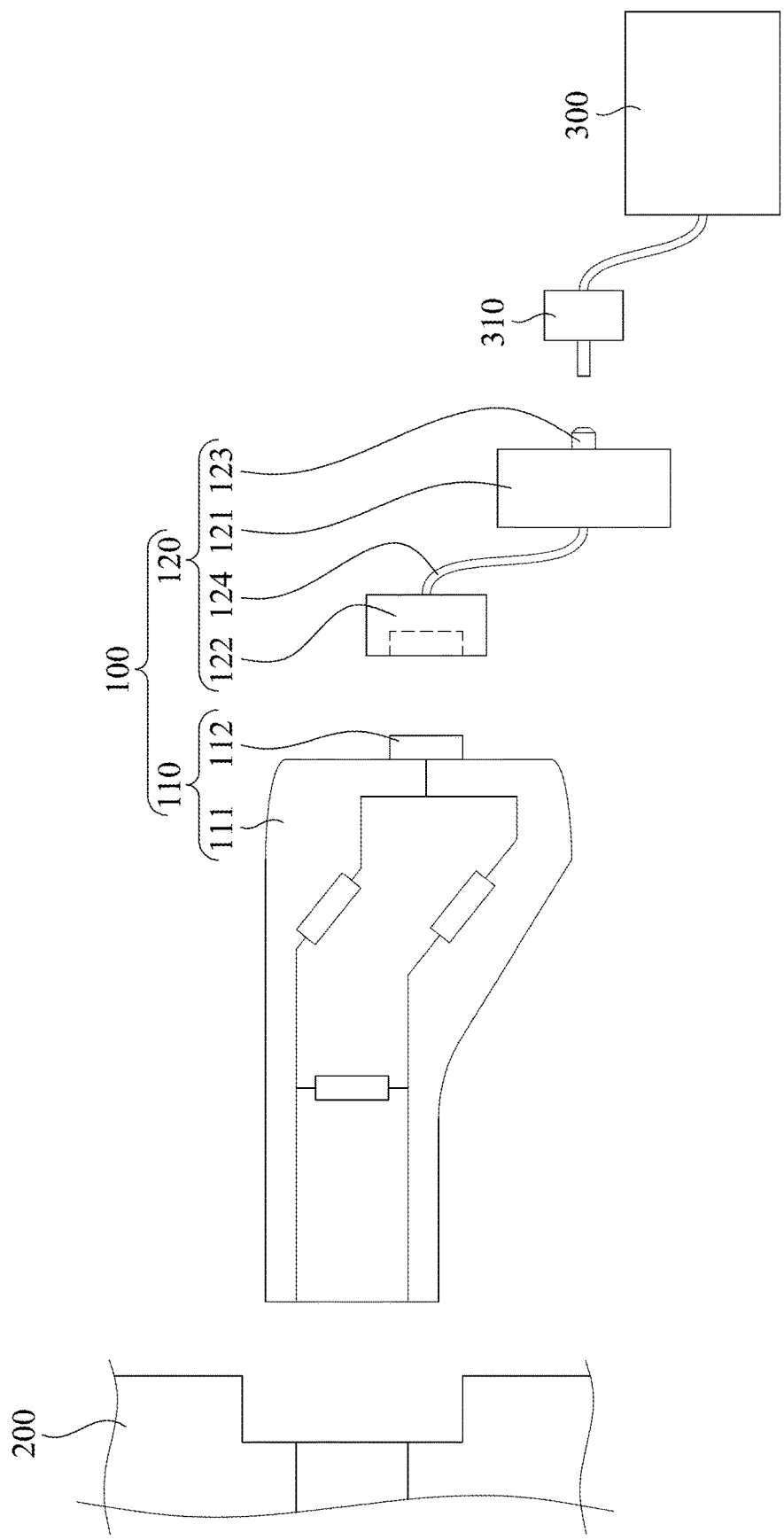
FIG. 7 is a schematic view of a vehicle power adaptor module according to another embodiment of the present disclosure, in which a connecting cable is connected between the socket body and the second connecting portion.

Reference is made to FIG. 7. FIG. 7 is a schematic view of a vehicle power adaptor module 100 according to another embodiment of the present disclosure, in which a connecting cable 124 is connected between the socket body 121 and the second connecting portion 122. In this embodiment, as shown in FIG. 7, the interchangeable socket 120 further includes a connecting cable 124. The connecting cable 124 is connected between the socket body 121 and the second connecting portion 122, such that the relative position between the socket body 121 and the second connecting portion 122 can be freely adjusted. In this way, the flexibility of use of the vehicle power adaptor module 100 can be effectively enhanced. Moreover, when the electronic equipment 300 is pulled up, the interchangeable socket 120 will be automatically detached under a certain amount of tension. Thus, the damage of the vehicle-sided connector 110 of the vehicle power adaptor module 100 at the connecting point at the vehicle side can be avoided.

Figure 8:
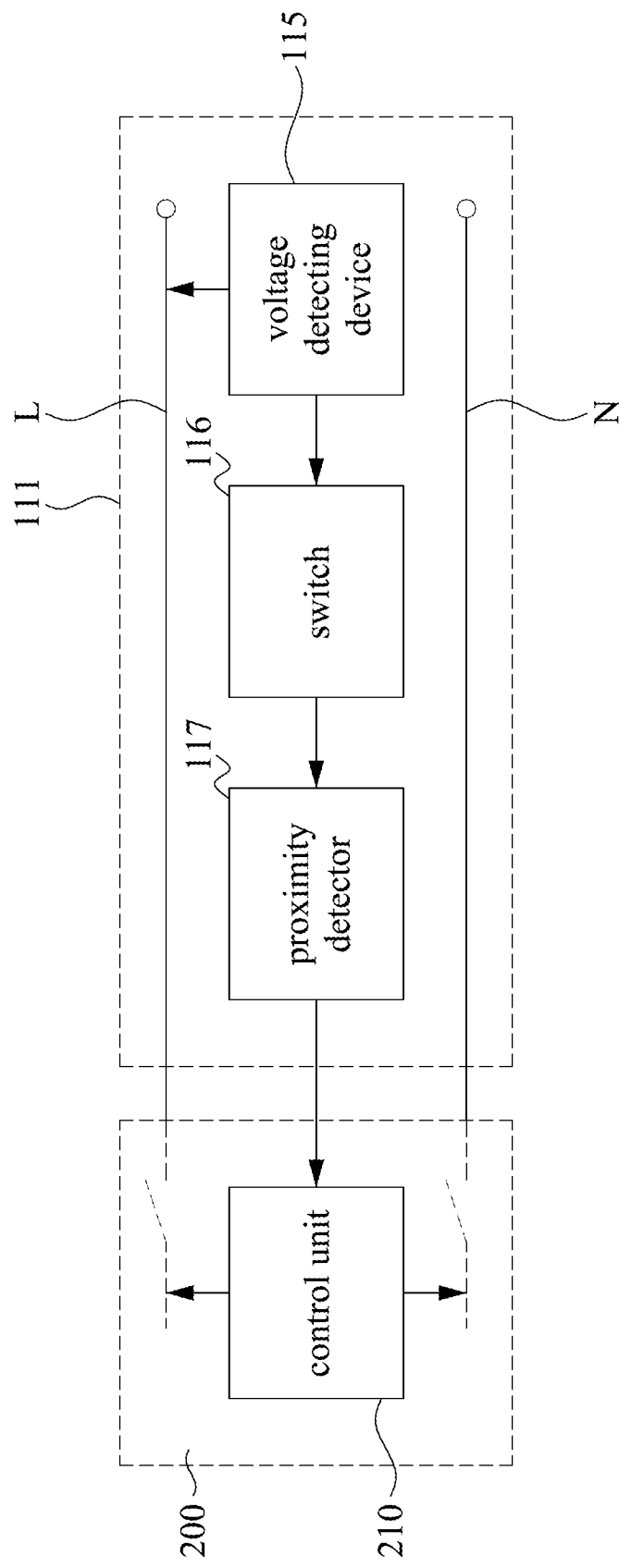
FIG. 8 is a schematic view of function blocks of the vehicle power adaptor module of FIG. 1.

Reference is made to FIG. 8. FIG. 8 is a schematic view of function blocks of the vehicle power adaptor module 100 of FIG. 1. In this embodiment, as shown in FIG. 8, the connector body 111 further includes a live line L, a neutral line N, a voltage detecting device 115, a switch 116 and a proximity detector 117. The live line L and the neutral line N are respectively configured to electrically connect with the electric vehicle 200 and the first connecting portion 112 (please refer to FIGS. 1-2 & 7). The voltage detecting device 115 is electrically connected between the live line L and the neutral line N, and is configured to detect a voltage difference between the live line L and the neutral line N. The switch 116 is signally connected with the voltage detecting device 115 and the proximity detector 117. The proximity detector 117 is configured to signally connect with a control unit 210 of the electric vehicle 200.

When the electric vehicle 200 supplies electricity to the electronic equipment 300 (please refer to FIGS. 1-2 & 7) through the vehicle power adaptor module 100, if it is detected by the voltage detecting device 115 that a voltage difference between the live line L and the neutral line N is larger than a particular pre-determined value, the voltage detecting device 115 will start up the switch 116 and the switch 116 will then turn off the proximity detector 117, such that the control unit 210 of the electric vehicle 200 loses the signal from the proximity detector 117, and the electric vehicle 200 immediately stops supplying electricity to the electronic equipment 300. In this way, the safety of use of the vehicle power adaptor module 100 can be guaranteed.

Figure 9:
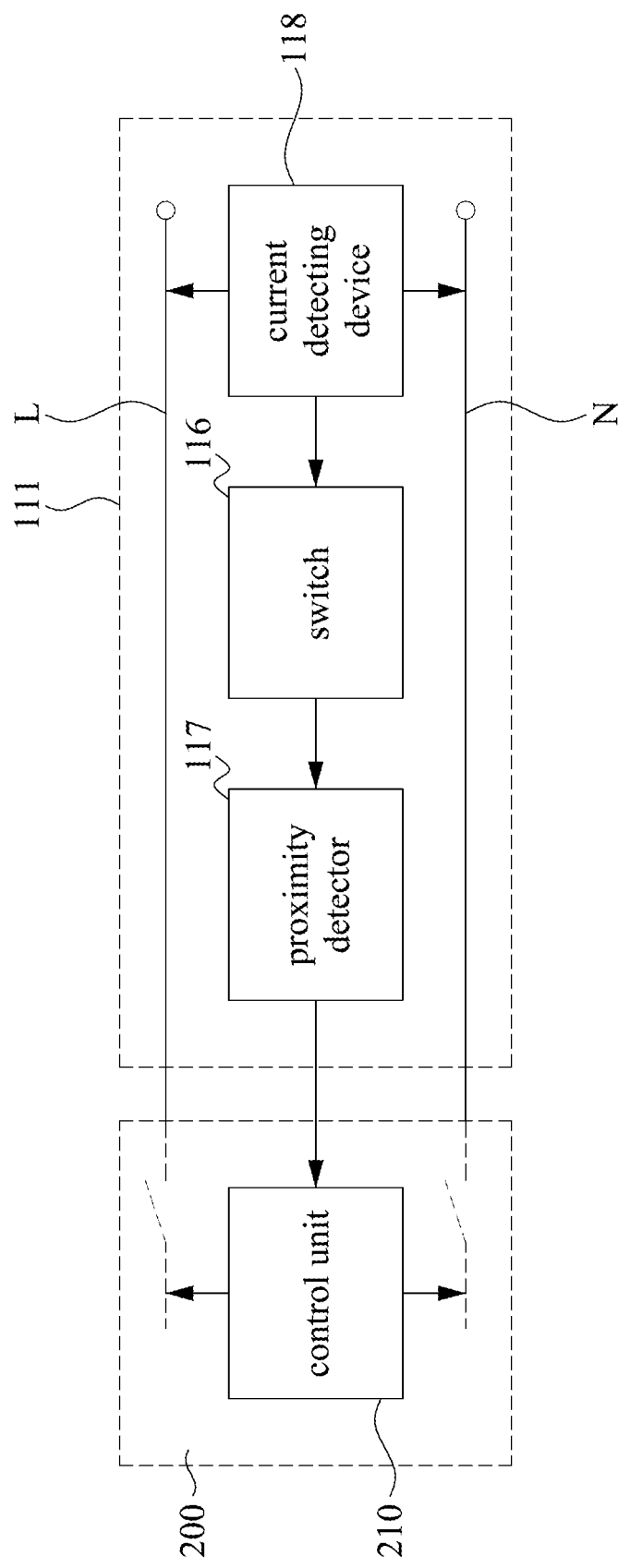
FIG. 9 is a schematic view of function blocks of a vehicle power adaptor module according to another embodiment of the present disclosure.

Reference is made to FIG. 9. FIG. 9 is a schematic view of function blocks of a vehicle power adaptor module 100 according to another embodiment of the present disclosure. In this embodiment, as shown in FIG. 9, the connector body 111 further includes a live line L, a current detecting device 118, a switch 116 and a proximity detector 117. The live line L is configured to electrically connect with the electric vehicle 200 and the first connecting portion 112 (please refer to FIGS. 1-2 & 7). The current detecting device 118 is electrically connected with the live line L, and is configured to detect a current of the live line L. The switch 116 is signally connected with the current detecting device 118 and the proximity detector 117. The proximity detector 117 is configured to signally connect with a control unit 210 of the electric vehicle 200.

When the electric vehicle 200 supplies electricity to the electronic equipment 300 (please refer to FIGS. 1-2 & 7) through the vehicle power adaptor module 100, if it is detected by the current detecting device 118 that a current of the live line L is larger than a particular pre-determined value, the current detecting device 118 will start up the switch 116 and the switch 116 will then turn off the proximity detector 117, such that the control unit 210 of the electric vehicle 200 loses the signal from the proximity detector 117, and the electric vehicle 200 immediately stops supplying electricity to the electronic equipment 300. In this way, the safety of use of the vehicle power adaptor module 100 can be guaranteed.

Figure 10:
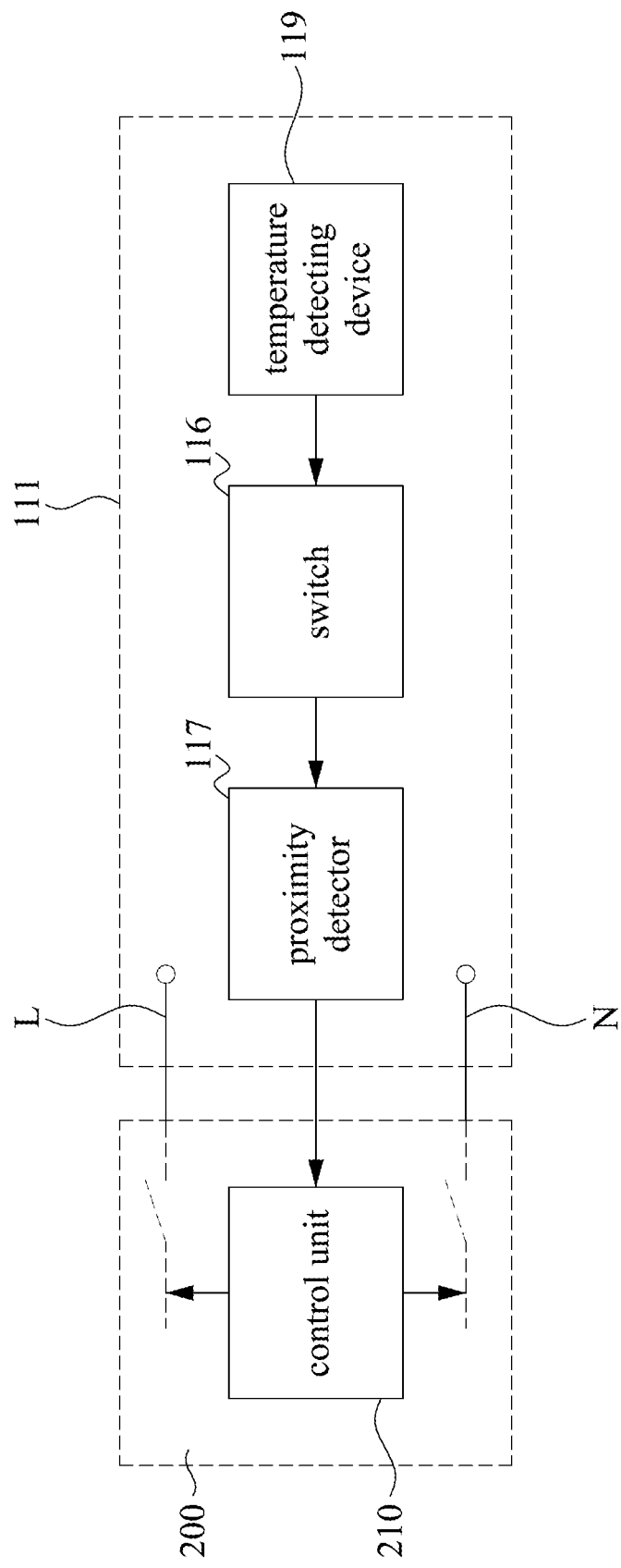
FIG. 10 is a schematic view of function blocks of a vehicle power adaptor module according to a further embodiment of the present disclosure.

Reference is made to FIG. 10. FIG. 10 is a schematic view of function blocks of a vehicle power adaptor module 100 according to a further embodiment of the present disclosure. In this embodiment, as shown in FIG. 10, the connector body 111 further includes a temperature detecting device 119, a switch 116 and a proximity detector 117. The temperature detecting device 119 is connected with the connector body 111, and is configured to detect a temperature of the connector body 111. The switch 116 is signally connected with the temperature detecting device 119 and the proximity detector 117. The proximity detector 117 is configured to signally connect with a control unit 210 of the electric vehicle 200.

When the electric vehicle 200 supplies electricity to the electronic equipment 300 (please refer to FIGS. 1-2 & 7) through the vehicle power adaptor module 100, if it is detected by the temperature detecting device 119 that a temperature of the connector body 111 is larger than a particular pre-determined value, the temperature detecting device 119 will start up the switch 116 and the switch 116 will then turn off the proximity detector 117, such that the control unit 210 of the electric vehicle 200 loses the signal from the proximity detector 117, and the electric vehicle 200 immediately stops supplying electricity to the electronic equipment 300. In this way, the safety of use of the vehicle power adaptor module 100 can be guaranteed.

As mentioned above, with the presence of the voltage detecting device 115, the current detecting device 118 and the temperature detecting device 119 of the connector body 111, when the electric vehicle 200 supplies electricity to the electronic equipment 300 through the vehicle power adaptor module 100, the voltage difference, the current or the temperature can be avoided from getting too high inside the vehicle-sided connector 110. Thus, the safety of use of the vehicle power adaptor module 100 can be enhanced.

In conclusion, when compared with the prior art, the aforementioned embodiments of the present disclosure have at least the following advantage:

(1) Since a user can separate the interchangeable socket from the vehicle-sided connector and the electronic equipment in a simple and easy manner, the user can replace and use an appropriate one of the interchangeable socket according to different plug types of the electronic equipment or according to different specifications of the plugs of the electronic equipment of different countries. In other words, by replacing an appropriate one of the interchangeable socket, the electric vehicle can be electrically connected with different types of the electronic equipment so as to supply electricity to different types of the electronic equipment, which is convenient to the user.

(2) When the plug of the electronic equipment is not electrically connected with the connector of the socket body, the button of the socket body does not send any signal to the electric vehicle. Correspondingly, the electric vehicle does not supply electricity to the vehicle power adaptor module. Apart from a saving of electricity, this can also enhance the safety of use of the vehicle power adaptor module.

(3) With the presence of the voltage detecting device, the current detecting device and the temperature detecting device of the connector body, when the electric vehicle supplies electricity to the electronic equipment through the vehicle power adaptor module, the voltage difference, the current or the temperature can be avoided from getting too high inside the vehicle-sided connector. Thus, the safety of use of the vehicle power adaptor module can be enhanced.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A vehicle power adaptor module, comprising:
a vehicle-sided connector comprising a connector body and a first connecting portion connected with the connector body, the connector body being configured to electrically connect with an electric vehicle, and
an interchangeable socket comprising a socket body and a second connecting portion connected with the socket body, the socket body being configured to electrically connect with an electronic equipment, the second connecting portion being configured to detachably connect with the first connecting portion, the socket body comprising at least one connector and a button adjacent to the connector, the connector being of a format of Universal Serial Bus (USB) and being configured to allow a plug of the electronic equipment to electrically connect with, the button being signally connected with the electric vehicle and being configured to be pressed by the plug of the electronic equipment.

2. The vehicle power adaptor module of claim 1, wherein a type of the connector is a Type-A connector, a Type-B connector, a Type-C connector, a Mini-A connector, a Mini-B connector, a Micro-A connector or a Micro-B connector.

3. The vehicle power adaptor module of claim 1, wherein the connector body further comprises a live line, a neutral line, a sensor, a switch and a proximity detector, the live line and the neutral line are respectively configured to electrically connect with the electric vehicle and the first connecting portion, the sensor is electrically connected between the live line and the neutral line and is signally connected with the button, the switch is signally connected with the sensor and the proximity detector, the proximity detector is configured to signally connect with a control unit of the electric vehicle.

4. The vehicle power adaptor module of claim 3, wherein the button provides a signal to the sensor when the plug presses on the button.

5. The vehicle power adaptor module of claim 1, wherein a quantity of the connector is plural, types of the connectors are different from each other.

6. The vehicle power adaptor module of claim 1, wherein a quantity of the connector is plural, types of the connectors are same as each other.

7. The vehicle power adaptor module of claim 1, wherein the socket body has two first socket holes and one second socket hole, the first socket holes and the second socket hole are configured to allow the plug of the electronic equipment to insert into, the first socket holes and the second socket hole are arranged in a triangular manner.

8. The vehicle power adaptor module of claim 1, wherein the connector body further comprises a live line, a neutral line, a voltage detecting device, a switch and a proximity detector, the live line and the neutral line are respectively configured to electrically connect with the electric vehicle and the first connecting portion, the voltage detecting device is electrically connected between the live line and the neutral line and is configured to detect a voltage difference between the live line and the neutral line, the switch is signally connected with the voltage detecting device and the proximity detector, the proximity detector is configured to signally connect with a control unit of the electric vehicle.

9. The vehicle power adaptor module of claim 8, wherein the voltage detecting device starts up the switch and the switch then turns off the proximity detector when the voltage difference between the live line and the neutral line is detected to be larger than a pre-determined value by the voltage detecting device.

10. The vehicle power adaptor module of claim 1, wherein the connector body further comprises a live line, a current detecting device, a switch and a proximity detector, the live line is configured to electrically connect with the electric vehicle and the first connecting portion, the current detecting device is electrically connected with the live line and is configured to detect a current of the live line, the switch is signally connected with the current detecting device and the proximity detector, the proximity detector is configured to signally connect with a control unit of the electric vehicle.

11. The vehicle power adaptor module of claim 10, wherein the current detecting device starts up the switch and the switch then turns off the proximity detector when the current of the live line is detected to be larger than a pre-determined value by the current detecting device.

12. The vehicle power adaptor module of claim 1, wherein the connector body further comprises a temperature detecting device, a switch and a proximity detector, the temperature detecting device is connected with the connector body and is configured to detect a temperature of the connector body, the switch is signally connected with the temperature detecting device and the proximity detector, the proximity detector is configured to signally connect with a control unit of the electric vehicle.

13. The vehicle power adaptor module of claim 12, wherein the temperature detecting device starts up the switch and the switch then turns off the proximity detector when the temperature of the connector body is detected to be larger than a pre-determined value by the temperature detecting device.

14. A vehicle power adaptor module, comprising:
a vehicle-sided connector comprising a connector body and a first connecting portion connected with the connector body, the connector body being configured to electrically connect with an electric vehicle, and
an interchangeable socket comprising:
a socket body comprising at least one connector and a button adjacent to the connector, the connector being of a format of Universal Serial Bus (USB) and being configured to allow a plug of an electronic equipment to electrically connect with, the button being signally connected with the electric vehicle and being configured to be pressed by the plug of the electronic equipment;
a second connecting portion configured to detachably connect with the first connecting portion; and
a connecting cable connected between the socket body and the second connecting portion.

* * * * *